United States Patent [19]
Kelly, Jr.

[11] Patent Number: 5,655,624
[45] Date of Patent: Aug. 12, 1997

[54] OIL FILTER SPILL DIRECTOR ATTACHMENT FOR ENGINE BLOCKS

[76] Inventor: Richard L. Kelly, Jr., 4730 Via Corona, Yorba Linda, Calif. 92687

[21] Appl. No.: 523,077

[22] Filed: Sep. 1, 1995

[51] Int. Cl.⁶ ..................................................... F16C 3/14
[52] U.S. Cl. ............................................................. 184/1.5
[58] Field of Search ........................... 123/196 R, 196 A, 123/195 S, 198 E; 184/1.5

[56] References Cited

U.S. PATENT DOCUMENTS

| | | | |
|---|---|---|---|
| 4,800,933 | 1/1989 | Moore et al. | 184/1.5 |
| 5,121,776 | 6/1992 | Kovach | 184/1.5 |
| 5,320,145 | 6/1994 | Avino | 184/1.5 |
| 5,404,848 | 4/1995 | Nelson | 123/198 E |

FOREIGN PATENT DOCUMENTS 0138810  6/1986  Japan ......................................... 184/1.5

*Primary Examiner*—Erick R. Solis
*Attorney, Agent, or Firm*—William H. Maxwell

[57] ABSTRACT

An oil filter spill directer attachment for engines and comprised of a flat reformable member of maleable material characterized by a mounting section for attachment to the engine and an oil collector section with a trough for directing an oil spill, the sections being defined by side flanges with weakening on predetermined bend lines to angularly displace said sections for effectively adapting the attachment to an engine, for directing oil away from the engine as the filter is removed.

12 Claims, 2 Drawing Sheets

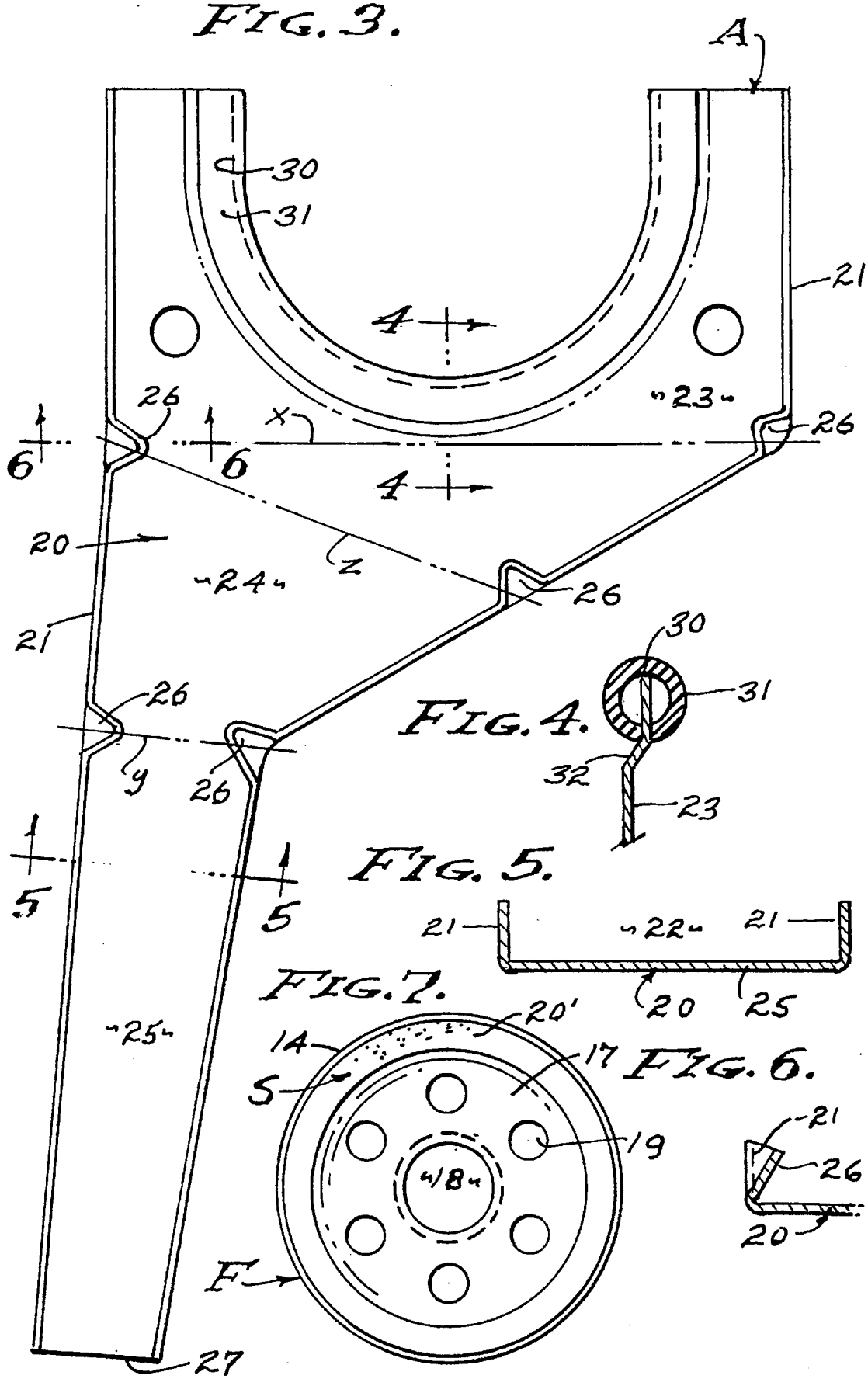

OIL FILTER SPILL DIRECTOR ATTACHMENT FOR ENGINE BLOCKS

BACKGROUND OF THE INVENTION

State of the art engine driven vehicles, and other engine installations as well, are equiped with oil filters in order to maintain clean lubrication. It is the automotive field with which this invention is particularly concerned and characterized by compact-complicated engine installations with hard-to-get-to components among which is the oil filter. The oil filter component is usually engine mounted and is accessible among other components such as the alternator, the refrigeration pump, and the power steering pump, all of which are closely mounted around the engine. A further complication with respect to the engine per se is the intake and exhaust manifold and pipe. And still further there is the running gear or suspension and the steering members that closely surround the engine. It is these components that vary in size, configuration and location in the many makes and year models of automobiles and trucks, and virtually all of which are equiped with an oil filter that must be replaced frequently and in the course of which oil is spilled onto any one or more of the aforementioned surrounding components. For example, the underlying running gear will become dripping wet with used engine oil, or the underlying refrigeration pump will become dripping wet with oil, or any other component or vehicle member will become wetted with oil when the removed and opened oil filter is passed thereover in the course of removal. A problem is that the oil filter is most often side mounted to the engine block and on a horizontal axis, in which case there is a moment in time during which the saturated oil filter discharges oil, before it can be uprighted. That is, used-dirty-odorous oil is invariably spilled on other engine components and onto surrounding chassis structure, it being a general object of this invention to prevent spillage of used oil from oil filters as and when they are being removed from an engine installation thereof.

There is a wide variety of oil filter shapes and sizes but which have a common mode of attachment to the engine blocks. State of the art oil filter installation is comprised of a threaded oil pressure tube onto which the oil filter body is screw threaded for attachment, and surrounding the pressure tube there is an oil return annulus within a circular seat that engages a circular seal ring carried by the oil filter body. The pressure tube and seat are provided on the engine block, usually disposed concentrically on a horizontal axis. The oil filter is provided with a bulkhead threaded for engagement onto the pressure tube and provided with the circular seal surrounding return oil ports in said bulkhead. The aforesaid engine block features are closely positioned to the side of the engine block and beneath the intake or exhaust manifold, sometimes flush with the side of the engine block and sometimes extended laterally on a boss, it being an object of this invention to provide a spill director attachment that is adaptable to the many different engine configurations. That is, the features of the attachment provided by this invention can be embodied in various structures to fit the various engine configurations. Accordingly, I provide a trough with attachment means to the side of an engine block, and with seal means closely engaged around the circular oil filter seat on the engine block and/or closely around or engaged with a boss on which the circular oil filter seat is formed.

The oil filter spill director attachment of this invention is characterized by its trough-like configuration that is shaped and formed to transport spilled oil to a discharge point where it can be conveniently collected and/or disposed of. It is to be understood that small quantities of spilled oil is involved, and accordingly the trough is in practice a shallow declining channel turned in directions determined by the surrounding engine accessories and components that are to be protected from the oil spills. Also, it is an object to accomodate abnormal accessories and components, in which case the trough of the present invention is bendable as it is made of maleable material that can be reformed as may be required to bypass whatever accessories and components without contacting the same. In carrying out this invention the oil filter spill director attachment is made of a plastic or maleable sheet metal with a plastic or rubber-like seal to engage the engine block.

A typical internal combustion engine is equiped with an electric generator, and provision for hydraulic steering pump and a refrigeration compressor. Accordingly, bosses with threaded openings are provided for mounting a generator and/or pumps. And, these mounting bosses are to be found at the cooler intake manifold side of the engine and where the oil filter boss is located. For example, a pair of mounting holes for the generator is likely to be found embracing the oil filter boss, however this will vary from one engine to another. Therefore, the hole pattern provided in the attachment of the present invention is a variable made to accomodate each make and model of engine. A typical hole pattern is shown in FIG. 2 herein comprised of a pair of holes and fasteners threaded into the side of the engine block as indicated in FIG. 1. The mode of attachment can vary as circumstances require.

The foregoing and various other objects and features of this invention will be apparent and fully understood from the following detailed description of the typical preferred forms and applications thereof, throughout which description reference is made to the accompanying drawings.

THE DRAWINGS

FIG. 3 is a front view of of the attachment before installation, showing means for its installation, means for sealing against the engine, and means for reforming the attachment along predetermined lines.

FIG. 4, is an enlarged sectional view taken as indicated by line 4—4 on FIG. 3.

FIG. 5 is an enlarged sectional view taken as indicated by line 5—5 on FIG. 3.

FIG. 6 is an enlarged sectional view taken as indicated by line 6—6 on FIG. 3.

Figure 1:
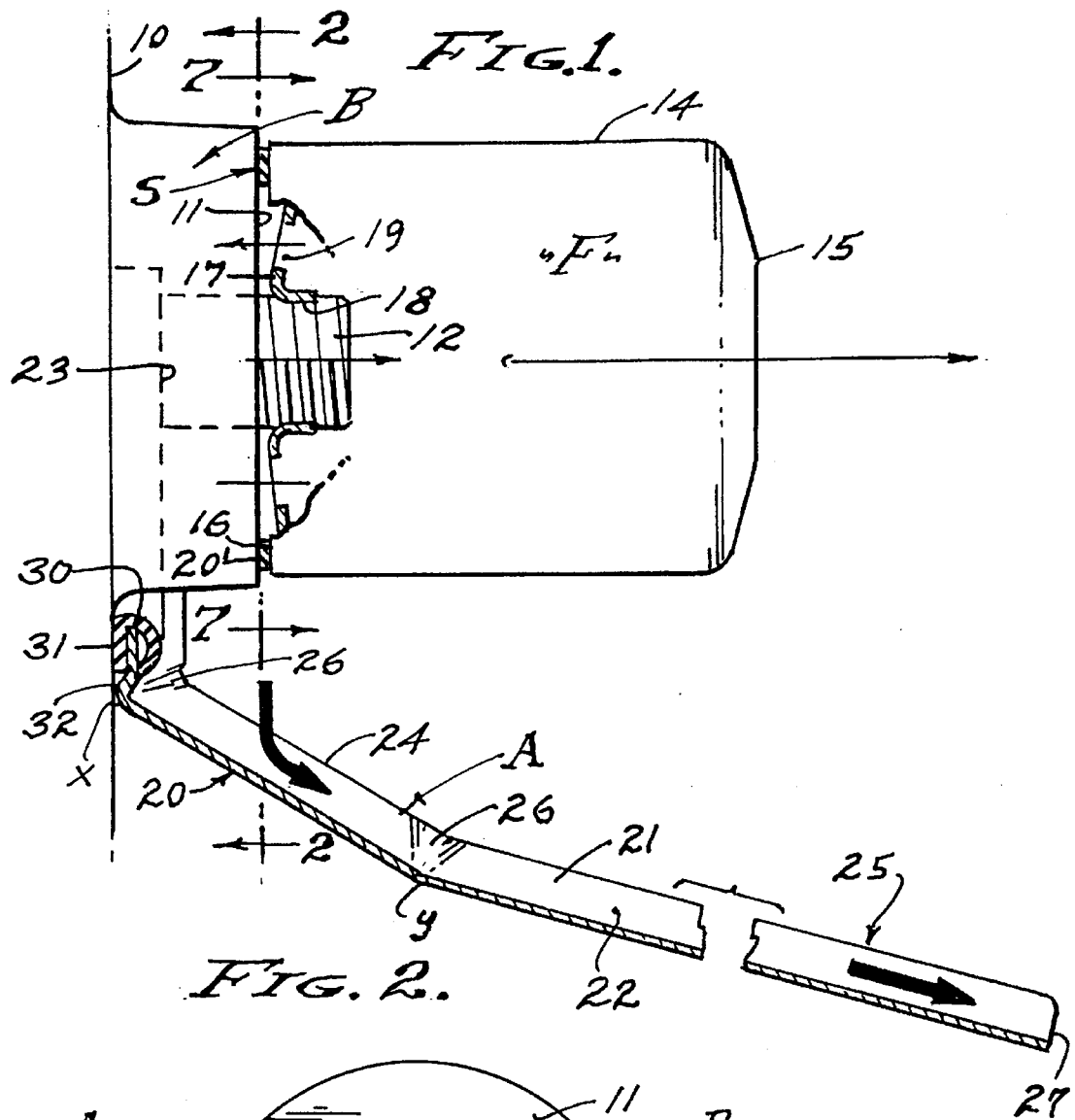
FIG. 1 is a side elevation partially in section, showing a typical installation of the Oil Filter Spill Director Attachment of the present invention.
Figure 2:
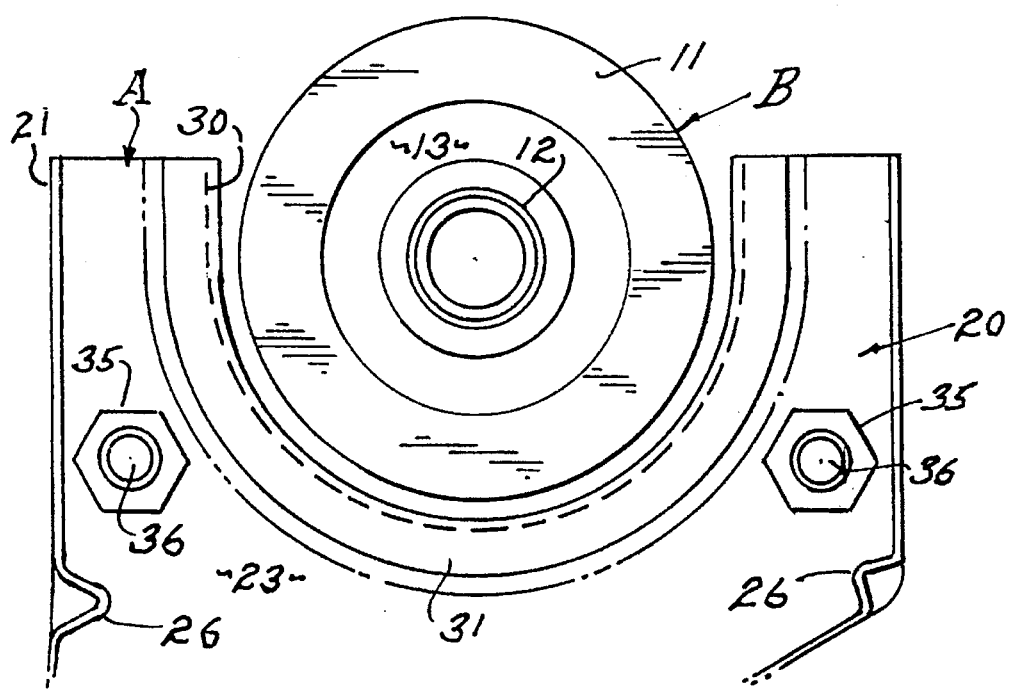
FIG. 2 is a view showing typical engine features that receive an oil filter and the attachment of this invention installed in the usual manner, and taken as indicated by line 2—2 on FIG. 1.

And, FIG. 7 is a view showing typical oil filter features that interface with the engine features shown in FIG. 2, and taken as indicated by line 7—7 in FIG. 1.

PREFERRED EMBODIMENT:

Referring now to the drawings, a typical oil filter F is shown installed on the side 10 of a typical internal combustion auto engine. The side of the engine is vertical, though it is often at an angle, and the axis of the filter installation is horizontal, though it is often inclined, with the filter F projecting laterally from the side 10 of the engine. As is common practice, there is a planar seat 11 formed on the side 10 of the engine, surrounding a threaded oil pressure tube 12 that projects from the plane of the seat, with an annulus 13 for return oil between the seat 11 and tube 12. As shown the aforementioned filter mount features are embodied in boss B that projects from the side 10 of the engine block. Accordingly, engine oil is recirculated from the tube 12, through the oil filter F, and returns into the engine via the annulus 13.

The typical oil filter F is comprised of a canister-like body 14 of cup-shaped cylinder form closed at one end 15 and open to the aforesaid engine oil filter attachment features at the other end 16. The open end 16 of the filter body carries a bulkhead 17 with its perimeter sealed to the filter body 14 and with coupling and recirculation features. As shown, the bulkhead 17 has a threaded oil inlet opening 18 for threaded attachment to the threaded pressure tube 12, and the bulkhead 17 has oil return ports 19 open to the annulus 13 for recirculation of filtered oil into the engine. A feature of the oil filter F is the circular seal S carried by the bulkhead 17 to surround the return ports 19, a flat seal having a planar face 20' that interfaces with the seat 11 surrounding the annulus at the suction side of the engine oil recirculation.

In accordance with this invention, I provide a trough member A characterized by an initially flat member 20 having opposite side edge flanges 21 forming a trough 22 of channel configuration (see FIG. 5). The member 20 is sectional, having a mounting section 23, having an oil collection section 24, and having an oil transport section 25. The sections 23-25 are integrally formed preferably of plastic or sheet material that is reformable, for example of low carbon sheet steel that is maleable so as to be formed with right angular edge flanges 21. In practice, a thin sheet of approximately 0.040 inch thickness is blanked and formed as shown in FIGS. 3-6 of the drawings. Sections 23-25 are initially formed in a common plane.

The mounting section 23 of trough member A is a flat section of sheet material that embraces the boss B and/or the oil filter mounting features 11-13 on the engine block. In practice, the section 23 extends from beneath the bottom of the oil filter seat 11 to a level above the mounting axis of the oil filter at both sides thereof, there being an upwardly open semi-circular notch 30 to accomodate the boss B and/or said mounting features 11-13 with clearance. The marginal edge of notch 30 carries a seal 34 in the form of a depressible member that is pressed against the side 10 of the engine block. As shown, the seal 31 is a slit tube or the like with a wall that flattens onto side 10, the sheet material being joggled at 32 so that the sheet metal interfaces with the side 10 when the seal 31 is depressed.

In accordance with this invention, the bottom of section 23 is defined by a bend line X that extends between opposite edges of the attachment. As shown, bend line X is horizontal, though it can be at any angle, and terminating at the opposite right angular side flanges 21. A feature is the weakening means 26 at each opposite side flange 21, shown best in FIGS. 3 and 6 as an inwardly formed V-shaped indentation that interrupts the otherwise continuous flanges. These spaced indentations at opposite ends of the bend line X weaken the flanges 21 so that they yield when the maleable sheet material of the attachment A is bent along said bend line X. A typical bend which is accomplished manually is clearly shown in FIG. 1 of the drawings.

The weakening means 26 in flange 21 is a "V"-shaped tapered fold as shown, similar to a bellows fold comprised of a pair of hinged walls integrally joined together at the bottom of the "V" and integrally joined to the interrupted flange 21 at the spaced tops of the "V". Thus, the bellows shaped weakening means 26 can either open or close about the bottom of the "V", which permits bending of the sections 23 and 24 at the plane of member 20.

The oil collection section 24 of attachment member A is a flat section of the sheet material that extends from the bend line X to underly the interface engagement between the seat 11 and the seal S of the oil filter F, its extent being determined by a bend line Y spaced downward from the first mentioned bend line X. The spaced sides and/or flanges 21 of section 24 are continuations of those of section 23, and they emanate from the weakening means 26 at bend line X and continue to the weakening means 26 at opposite side flanges 21 at bend line Y. The shape or plan configuration of section 24 will vary as circumstances require in order to avoid and circumvent the various aforementioned accessories and components that may be in the space near to the oil filter installation. As shown and assuming that an accessory or component occupies the space to the right of the oil filter F, the bend line Y defined by the spaced weakining means 26 and flanges 21 are shifted toward the left of the oil collection section 24. A typical configuration is shown in FIG. 3, the left hand flange being turned slightly to the left and the right hand flange being turned extremely toward the left, whereby the trough configuration is narrowed for constriction of the oil transport section 25. In carrying out this invention, the oil collection section 24 is bent manually upward at bend line X so as to underlie the oil filter connection interface to the engine block (see FIG. 1).

The oil transport section 25 of attachment member A is a flat section of the sheet material that extends from the bend line Y to its terminal end 27. In accordance with this invention, the trough shape (see FIG. 5) converges to the terminal end 27 in order to constrict the discharge of oil for its convenient collection is a suitable can or container (not shown). The spaced sides-flanges 21 of section 25 are continuations of those of section 24, emanating from the weakening means 26 at bend line Y and continuing to the terminal end 27 where they are closely spaced to form a spout. As shown and assuming that it is most convenient to have the terminal spout end 27 lowered, the oil transport section 25 is manually bent downward at bend line Y as as to decline to a selected discharge position (see FIG. 1). It can also be bent upward (see FIG. 1).

Other bend lines are provided as are necessary for peculiar situations, and for example I have shown an intermediate bend line Z in FIG. 3 of the drawings, whereby the oil collection section 24 can be bent into several planes. As shown, a weakening marts 26 is formed in a flange 21 between the bend lines X and Y. And, a variation is provided by extending the bend line Z to either one or another one of the previously described opposed weakening means 26. For example, the bend line Z is extended to the opposite weakening means 26 and bend line X. That is, the plurality of bend lines X, Y and Z can share or have separate weakening means 26 as the circumstances require.

Mounting of this attachment member A to the side 10 of the engine is by means of a pair of spaced screw fasteners 36 as shown in FIG. 2 of the drawings, so that the collection section 24 is disposed beneath the plane of sealed attachment of the oil filter F to seat 11. As shown in FIG. 1, the mounting section 23 applies the seal 31 to the side of the engine surrounding the oil filter boss B. In practice, threaded studs 36 project through the spaced openings in the section 23 to receive nut type fasteners 35, or the fasteners 36 can be bolts or cap-screws threadedly engaged into the engine block. It is to be understood that the fasteners 36 can be shared with the mounting of an electric generator, or with an accessory pump or compressor, as may be required.

Having described only the typical preferred form and application of my invention, I do not wish to be limited or restricted to the specific details herein set forth, but wish to reserve to myself any modifications or variations that may appear to those skilled in the art, as set forth within the limits of the following claims.

I claim:

1. An oil filter spill director attachment for engine blocks having a threaded oil pressure tube for filter body attachment surrounded by an oil return annulus within a circular seat for sealed engagement with the filter body, said attachment being an initially flat reformable member of maleable sheet material having opposite side flanges, and including;
   a mounting section formed of a portion of said member and comprised of a mounting having a notch for embracing the circular seat of the engine block, having means for attachment to the engine block and having a bottom defined by a bend line,
   an oil collection section formed of a portion of said member and continuing from the mounting section bend line and in the form of a trough configuration defined by the opposite side flanges, the trough configuration opening to discharge from an end of said member remote from the bend line,
   and weakening means on the bend line and at each side flange continuing from the mounting section to the oil collection section, for reforming said member by angularly displacing the sections thereof.

2. The oil filter spill director attachment as set forth in claim 1, wherein the weakening means is comprised of a "V"-shaped fold in each side flange and tapered to the bend line, whereby reforming of said member is controlled and angular displacement of the sections retained.

3. The oil filter spill director attachment as set forth in claim 1, wherein the weakening means is comprised of a "V"-shaped fold in each side flange and having a pair of hinged walls integrally joined together and to the continuing side flanges and tapered to the bend line, whereby reforming of said member is controlled and angular displacement of the sections is retained.

4. The oil filter spill director attachment as set forth in claim 1, wherein the notch has a marginal edge and a depressible seal coextensive with the edge to confine oil within the side flanges of said member.

5. The oil filter spill director attachment as set forth in claim 1, wherein the means for attachment is screw fasteners threadedly engaged through the mounting section and into the engine block.

6. An oil filter spill director attachment for engine blocks having a threaded oil pressure tube for filter body attachment surrounded by an oil return annulus within a circular seat for sealed engagement with the filter body, said attachment being an initially flat reformable member of maleable sheet material having opposite side flanges, and including;
   a mounting section formed of a portion of said member and comprised of a mounting having a notch for embracing the circular seat of the engine block, having means for attachment to the engine block and having a bottom defined by a bend line,
   an oil collection section formed of a portion of said member and continuing from the mounting section bend line and in the form of a trough configuration defined by the opposite side flanges and having a bend line spaced from the first mentioned bend line,
   an oil transport section formed of a portion of said member and continuing from the oil collection section in the form of a spout configuration defined by the opposite side flanges, the spout configuration opening to discharge from an end of said member remote from the last mentioned bend line,
   and weakening means on each of the bend lines and at each side flange continuing from the mounting section to the oil collection section and to the oil transport section, for reforming said member by angularly displacing the sections thereof.

7. The oil filter spill director attachment as set forth in claim 6, wherein the weakening means is comprised of a "V"-shaped fold in each side flange and tapered to the bend line, whereby reforming of said member is controlled and angular displacement of the sections is retained.

8. The oil filter spill director attachment as set forth in claim 6, wherein the weakening means is comprised of a "V"-shaped fold in each side flange and having a pair of hinged walls integrally joined together and to the continuing side flanges and tapered to the bend line, whereby reforming of said member is controlled and angular displacement of the sections is retained.

9. An oil filter spill director attachment for engine blocks having a threaded oil pressure tube for filter body attachment surrounded by an return annulus within a circular seat for sealed engagement with the filter body, said attachment being an initially flat reformable member of maleable sheet material having opposite side flanges, and including;
   a mounting section formed of a portion of said member and comprised of a mounting having a notch for embracing the circular seat of the engine block, having means for attachment to the engine block and having a bottom defined by a bend line,
   an oil collection section formed of a portion of said member and continuing from the mounting section bend line and in the form of a trough configuration defined by the opposite side flanges, the trough configuration opening to discharge from an end of said member remote from the bend line,
   an intermediate bend line spaced between the first mentioned bend line and the end of said member, for reforming the oil collection section,
   and weakening means on each of the bend lines and at each side flange continuing from the mounting section through the oil collection section, for reforming said member by angularly displacing the two sections and portions of the oil collection section.

10. The oil filter spill director attachment as set forth in claim 9, wherein the intermediate bend line is angularly disposed from the first mentioned bend line.

11. The oil filter spill director attachment as set forth in claim 9, wherein the weakening means is comprised of a "V"-shaped fold in each side flange and tapered to the bend lines, whereby reforming of said member is controlled and angular displacement of the sections is retained.

12. The oil filter spill director attachment as set forth in claim 9, wherein the weakening means is comprised of a "V"-shaped fold in each side flange and having a pair of hinged walls integrally joined together and to the continuing side flanges and tapered to the bend line, whereby reforming of said member is controlled and angular displacement of the sections is retained.

* * * * *